Jan. 11, 1944.  A. F. HASBROOK  2,338,811
LEVEL INDICATOR
Filed April 11, 1941
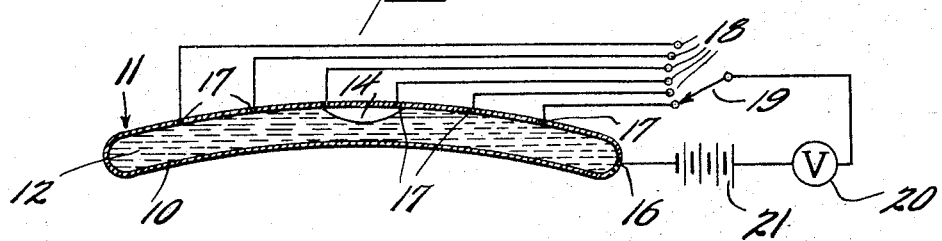
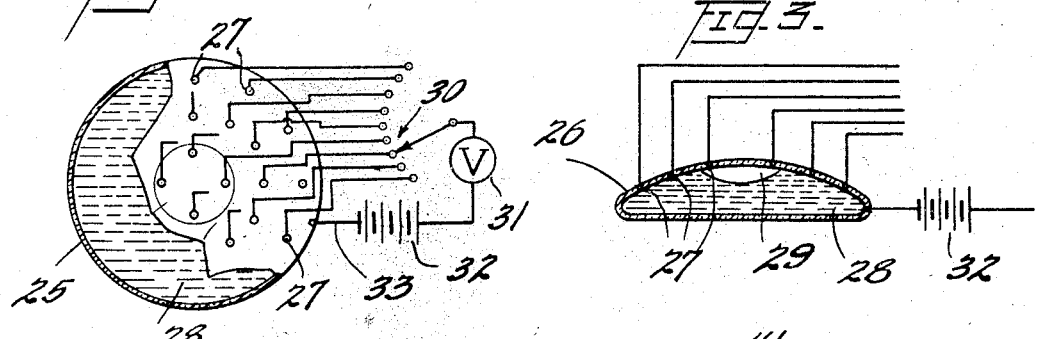
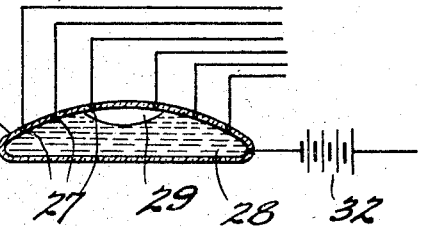
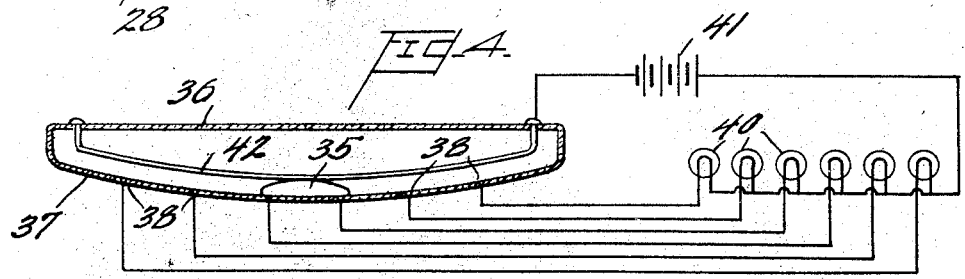
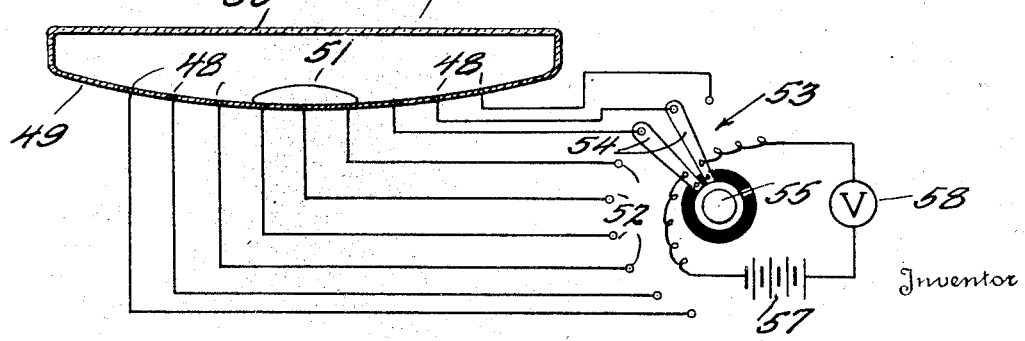

Patented Jan. 11, 1944

2,338,811

UNITED STATES PATENT OFFICE 2,338,811

LEVEL INDICATOR

Arthur F. Hasbrook, San Antonio, Tex., assignor to Olive S. Petty, San Antonio, Tex.

Application April 11, 1941, Serial No. 388,181

2 Claims. (Cl. 33—206)

This invention relates to improvements in level indicators and is particularly concerned with the provision of means whereby the tilting of an object may be ascertained from a point remote from the object.

It is frequently desirable to locate a measuring instrument or the like at a point which is more or less inaccessible and often important to determine accurately from a remote point the position of tilt of the instrument in order that account may be taken of the departure from the true level or in order that the instrument may be brought to the true level. For example, in the taking of gravity readings by a gravimeter of the type in which a mass is elastically suspended in an instrument casing, the gravitational pull on the mass being determined by measurement of the displacement of the mass within the casing, it is important that the instrument be accurately leveled before operation. Such readings are not infrequently taken when the instrument is located in water, or beneath the surface of the ground, for example in a well, and while provision may be made for adjusting the position of the instrument from the surface, it is essential in order that such adjustment be properly effected, that some remote indicating means be provided to show the departure of the instrument from the true level or position of zero tilt, preferably by an indication not only of any deviation from the true level, but of the direction and extent of such deviation. Various other instruments employed at inaccessible points are not required to be leveled, but the deviation from the position of zero tilt must be determined in order that compensation or adjustment of the readings obtained from the instrument may be effected.

It is accordingly the principal object of the instant invention to provide means for association with a device such as a measuring instrument which will afford an indication at a remote point and with reasonable accuracy whenever the device has been brought to a predetermined position of tilt. In the preferred form of the invention, the extent and direction of deviation from such predetermined position of tilt or from the true level are also remotely indicated.

Further objects and features of the invention will be apparent from the following description, taken in connection with the accompanying drawing, in which Figure 1 is a vertical sectional view of level indicating means embodying the principles of the invention;

Figure 2 is a horizontal sectional view illustrating a slightly modified form of the invention capable of indicating deviation from a predetermined position of tilt in any direction;

Figure 3 is a vertical sectional view of the structure shown in Figure 2; and

Figures 4 and 5 are views corresponding to Figure 3 and illustrating further modified forms of the invention.

In order to facilitate an understanding of the invention, reference will be made to the several embodiments thereof illustrated in the accompanying drawing and specific language will be employed. It will nevertheless be understood that various further modifications of the devices illustrated herein, such as would fall within the province of those skilled in the art to construct, are contemplated as part of the present invention.

In Figure 1 of the drawing is shown a form of level indicator which is effective to register the position of tilt of an object in one plane only. Thus, a container 10 which may be of glass and in the form of a vial similar to those commonly used in visual level indicators, having an upper wall 11 affording an inward concave surface, is employed. Suitable means, forming no essential part of the instant invention, may be provided for securing the container 10 to an object or instrument of which the position of tilt is to be determined. The container 10 is substantially filled with an electrically conducting fluid 12, the usual bubble 14 of air or other compatible gas being incorporated. A conductor 16 extends within the container so as to contact continuously with the conducting fluid 12 therein, and a plurality of conductors 17 are arranged at spaced points on the inner surface of the upper wall 11 of the container, the conductors 17 being electrically connected to a plurality of switch points positioned for engagement by a movable switch element 19. Switch element 19 is connected through an indicating instrument 20, for example a voltmeter, and through a voltage source 21 to the conductor 16. The volume of the bubble 14 is so correlated with the spacing of the conductors 17 that in any position occupied by the bubble over a substantial range of varying positions assumed by the container, the diameter of the bubble as measured on the inner surface of the upper wall 11 in the direction of the length of the container 10 is slightly greater than the distance between any two adjacent conductors 17.

Assuming that the container 10 is shown in Figure 1 as occupying a position corresponding to the true level position of the object or instrument with which the container is associated, it will be seen that this fact may immediately be determined by manipulation of the movable switch element 19. Thus in the position in which the container is shown, the meter 20 will give no response when the switch element 19 is engaged with those switch contacts 18 which are connected with the two centrally located conductors 17. If the container 10 is tilted slightly in one direction or the other, an indication will be given by the meter when one or the other of the centrally disposed conductors 17 is placed in the meter circuit. Positions of tilt further removed from the position of zero tilt or level position are correspondingly indicated, it being possible thus to determine the position assumed by the bubble 14 and accordingly the position of tilt of the object or instrument with which the container 10 is associated with reasonable accuracy at a point quite remote from the object. Any appropriate conducting liquid, for example mercury or some suitable electrolyte, may be employed.

By locating two such containers 10 on the object or instrument and arranging the same so that they extend substantially at right angles, the position of tilt in any direction may be noted and suitable correction or compensation may be effected.

In Figures 2 and 3 is shown an arrangement similar in principle to that illustrated in Figure 1, but employing only a single element for association with the object or instrument to determine the position of tilt thereof in any direction. Thus the container 25 of Figure 2 is similar to the so-called "bull's-eye" level, being circular in plan, the upper wall 26 of the container being formed to provide an internal surface which is slightly concave and having positioned thereon a plurality of conductors 27. As in the preceding embodiment of the invention, the container 25 is substantially filled with a conducting liquid 28, a bubble 29 being incorporated therein. Each of the conductors 27 is electrically connected to the contact points of a multiple switch 30 and thence through a suitable meter 31 and a source of voltage 32 to a return conductor 33 which is positioned for constant contact with the conducting liquid 28. In this arrangement the spacing of the conductors 27 and the size of the bubble 29 is preferably so correlated that when the container 25 occupies a level position, the four central conductors will lie within the area from which the conducting liquid is just excluded by the bubble, so that when the container and the object with which it is associated are level, this fact may be determined accurately from the remote point at which the switch 30 and meter 31 are located. The arrangement of other conductors is such that in any position of the bubble 29, at least one conductor will be insulated from the conducting liquid, so that a true indication of the position of level of the object or instrument may be obtained.

It is not essential to the invention that a non-conducting fluid be employed, since a void would constitute an obvious equivalent. Furthermore, either the conducting fluid or the non-conducting fluid or void may have the greater volume and contact the greater area of the surface in which the several conductors are disposed. Thus in Figure 4 is illustrated a device in which a relatively small bubble 35 of conducting fluid is disposed within a container 36, the bubble resting on the inner concave surface of the lower wall 37 of the container. Disposed in this surface are a plurality of conductors 38, each of which is connected to one terminal of the filament of a lamp 40, the other terminals being connected by a common lead through a source of voltage 41 and thence to a conducting element 42 which is supported within the container. The element 42 may be uniformly spaced from the inner surface of the lower wall 37 of the container so as to ensure contact with the bubble 35 of conducting fluid in all positions of the latter. The bubble 35 may be of mercury or other conducting fluid and is of such volume that the diameter thereof measured on the inner surface of the wall 37 of the container in the direction of the length of the latter is at least slightly larger than the distance between adjacent conductors 38. The non-conducting fluid occupying the balance of space in the container may be gaseous or liquid, or the container may be evacuated.

It will be seen that when the container 36 and the object with which it is associated occupies the level position in which it is shown in Figure 4, the two central lamps 40 of the bank will be lit to afford a visual indication of this fact. In any other position of tilt, the lamps which are lit will indicate with reasonable accuracy the extent and direction of deviation of the container and object from the level position. By the use of two such containers 36 disposed at right angles, tilting in both planes may be measured. Alternatively by modification of the arrangement shown in Figure 4 in the manner shown in Figures 2 and 3, a single container may be employed to measure the position of tilt in any direction, the lamps 40 being arranged in substantial accordance with the position of the corresponding conductors 38 to facilitate reading of the indicator. Obviously an indicating device of the nature shown in Figure 4 may be employed in any of the forms of the invention illustrated herein in lieu of a meter.

Turning now to Figure 5, it will be observed that the device shown therein functions to close an indicating circuit solely through the bridging of adjacent conductors. Thus the conductors 48 are disposed on the concave inner surface of the lower wall 49 of the container 50, the conducting bubble, indicated at 51, being of just sufficient size to bridge the three centrally disposed conductors when the container is level to facilitate accurate adjustment. In any other position of tilt of the container 50, at least two conductors 48 will be bridged. Each of the conductors 48 is connected to a separate switch point 52 of a multiple switch 53, the movable member of which comprises two arms 54 which are insulated from each other and which may be rotated by a central knob 55. The switch arms 54 are electrically connected through a source of voltage 57 and a meter 58.

When the container 50 and the object or instrument on which it is mounted are in a precisely level position, an indication will be given by the meter when the switch arms 54 are positioned for engagement with either adjacent pair of switch points connected to the three centrally disposed conductors 48. In any other position of the switch arms no indication will be given unless the container 50 is tilted, and the position of the switch arm at which an indication is then given will disclose the position of tilt. In this construction, as in those previously described, separate containers 50 arranged at right angles may be associated with an object or instrument to determine the extent of deviation of the latter from the level position in any direction. Alternatively, the arrangement described in connection with Figures 2 and 3 may be employed to permit the use of only one container.

In none of the illustrated embodiments of the invention it is essential that the surface in which the conductors are mounted shall be concave; under some conditions, for example, a more delicate reading can be secured by the use of a flat surface, or by a surface which is partially concave and partially flat, and it is intended that in this respect the practice shall follow that observed in the manufacture of conventional visual liquid indicators. It will of course be understood that in the event the surface in which the conductors are located is not formed of insulating material, suitable precautions should be taken to ensure adequate insulation between the conductors.

Having thus described the invention, what is claimed as new and desired to be secured by Letters Patent is:

1. In a level indicator, the combination with a container having therein a conducting fluid and a non-conducting fluid, said fluids separating so that the fluid of less volume forms a bubble displaceable along a wall of the container as the latter is tilted, of a multiplicity of conductors associated with said wall, said conductors being substantially uniformly spaced throughout the area surrounding the central portion of said wall, said bubble being just of sufficient size to contact concurrently with a plurality of conductors including certain conductors only when in the central portion of said wall, corresponding to a position of absolute level of the container, and being displaceable on tilting into contact with certain other conductors, and electrical means including a remotely disposed indicator operable in response to displacement of said bubble into contact with different conductors for indicating the extent to which said container is tilted and the direction of tilt.

2. In a level indicator, the combination with a container having therein a conducting fluid and a non-conducting fluid, said fluids separating so that the fluid of less volume forms a bubble displaceable along a wall of the container as the latter is tilted, of a multiplicity of conductors associated with said wall, said conductors being substantially uniformly spaced throughout the area surrounding the central portion of said wall, and electrical means including a remotely disposed indicator operable in response to displacement of said bubble into contact with different conductors for indicating the extent to which said container is tilted and the direction of tilt, said container wall having a surface over which the bubble is displaced which is concave to the bubble, the bubble being just of sufficient size to contact concurrently with a plurality of centrally disposed conductors only when the bubble engages the central portion of the wall, corresponding to a position of absolute level of the container.

ARTHUR F. HASBROOK.